US009540123B2

(12) United States Patent
Vollenkemper

(10) Patent No.: US 9,540,123 B2
(45) Date of Patent: Jan. 10, 2017

(54) PACKAGING MACHINE AND METHOD FOR FILLING BAGS

(71) Applicant: HAVER & BOECKER OHG, Oelde (DE)

(72) Inventor: Willi Vollenkemper, Oelde (DE)

(73) Assignee: HAVER & BOECKER OHG, Oelde (DE)

( * ) Notice: Subject to any disclaimer, the term of this patent is extended or adjusted under 35 U.S.C. 154(b) by 225 days.

(21) Appl. No.: 14/360,828

(22) PCT Filed: Nov. 27, 2012

(86) PCT No.: PCT/EP2012/004883
§ 371 (c)(1),
(2) Date: May 27, 2014

(87) PCT Pub. No.: WO2013/079186
PCT Pub. Date: Jun. 6, 2013

(65) Prior Publication Data
US 2014/0305542 A1 Oct. 16, 2014

(30) Foreign Application Priority Data

Nov. 28, 2011 (DE) .......................... 10 2011 119 451

(51) Int. Cl.
*B65B 1/06* (2006.01)
*B65B 39/10* (2006.01)
(Continued)

(52) U.S. Cl.
CPC . *B65B 1/06* (2013.01); *B65B 1/22* (2013.01); *B65B 1/28* (2013.01); *B65B 1/32* (2013.01);
(Continued)

(58) Field of Classification Search
CPC ................ B65B 1/06; B65B 1/22; B65B 1/28; B65B 1/32; B65B 1/34; G01G 13/022; G01G 13/24
(Continued)

(56) References Cited

U.S. PATENT DOCUMENTS 4,182,386 A * 1/1980 Alack .................. B65G 69/182
108/55.1
4,928,473 A * 5/1990 Nagao ....................... B65B 1/32
177/58

(Continued)

FOREIGN PATENT DOCUMENTS

DE         36 40 520      6/1988
DE      10 2008 043545    5/2010
(Continued)

*Primary Examiner* — Nicolas A Arnett
(74) *Attorney, Agent, or Firm* — Greer, Burns & Crain, Ltd.

(57) ABSTRACT

A packaging machine and method for filling bags with a supporting structure to which at least one filling box is fastened which includes a conveyor element and to which a weighing device and a filling spout are assigned. A control device is provided. The filling box is retained non-communicating with the supporting structure and the assigned filling box and is weighed separately by the assigned weighing device to discharge from the filling box a predefined quantity of intended fill product by way of differential weighing and to fill it into the bag through the filling spout. The control device controls the strength of a volume flow into the bag over the time of the filling process so that the intended fill product is maintained at a high fill height while overflow is simultaneously prevented.

12 Claims, 3 Drawing Sheets

(51) Int. Cl.
*B65B 43/50* (2006.01)
*B65B 57/14* (2006.01)
*B65B 1/22* (2006.01)
*B65B 1/28* (2006.01)
*B65B 1/32* (2006.01)
*G01G 13/02* (2006.01)
*G01G 13/24* (2006.01)

(52) U.S. Cl.
CPC ............... B65B 39/10 (2013.01); B65B 43/50 (2013.01); B65B 57/145 (2013.01); G01G 13/022 (2013.01); G01G 13/24 (2013.01)

(58) Field of Classification Search
USPC ................... 141/10–12, 71, 73–74, 83, 114
See application file for complete search history.

(56) References Cited

U.S. PATENT DOCUMENTS

| | | | | |
|---|---|---|---|---|
| 4,971,119 A | * | 11/1990 | Combrink | B65B 7/025 141/10 |
| 5,466,894 A | * | 11/1995 | Naef | B65B 1/22 141/83 |
| 6,655,421 B2 | * | 12/2003 | Kohashi | B65B 1/32 141/145 |
| 6,662,832 B2 | * | 12/2003 | Baker | B65B 39/12 141/10 |
| 7,191,807 B2 | * | 3/2007 | DeMaison | G03G 15/0877 141/302 |
| 8,104,520 B2 | * | 1/2012 | Ours | B65B 11/045 141/10 |
| 8,181,679 B2 | * | 5/2012 | Vollenkemper | B65B 1/06 141/10 |
| 9,150,315 B2 | * | 10/2015 | Vollenkemper | B65B 1/18 |
| 2003/0041916 A1 | * | 3/2003 | Kohashi | B65B 1/32 141/83 |
| 2008/0156394 A1 | * | 7/2008 | Vollenkemper | B65B 1/06 141/114 |
| 2008/0257450 A1 | | 10/2008 | Combrink | |
| 2009/0308486 A1 | * | 12/2009 | Ours | B65B 39/08 141/10 |
| 2011/0056585 A1 | * | 3/2011 | Combrink | B65B 1/22 141/74 |

FOREIGN PATENT DOCUMENTS

| | | |
|---|---|---|
| FR | 2456344 | 12/1980 |
| WO | 91/11689 | 8/1991 |
| WO | 91 11690 | 8/1991 |
| WO | 2007101836 | 9/2007 |

* cited by examiner

PACKAGING MACHINE AND METHOD FOR FILLING BAGS

BACKGROUND

The present invention relates to a packaging machine and a method for filling bags. The packaging machine according to the invention may be provided for bagging all kinds of bulk goods. This kind of system is particularly preferred for bagging fine-grain products, i.e. for bagging fine and dusty products requiring lengthy filling and in particular compacting times.

A great variety of packaging machines for filling open-mouth bags have been disclosed in the prior art. For example so-called FFS packaging machines ("Form Fill Seal packaging machines") tend to be used for efficiently filling bulk materials into open-mouth bags. In these FFS packaging systems the open-mouth bag is manufactured on the machine or in an immediately preceding device. The machine has a roll of tubular sheet assigned to it from which open-mouth bags are continuously manufactured during operation as required. A considerable advantage of these FFS packaging machines is that the open-mouth bags can be manufactured in the actually required lengths. There is no need to use prefabricated bags which are also more expensive.

FFS packaging machines process open-mouth bags of plastic sheets which may be waterproof. This is why open-mouth bags filled with hygroscopic materials—such as cement—are suitable for open-air storage after closing since their contents are reliably protected from moisture.

The drawback of known packaging machines for filling open-mouth bags is their limited filling capacity in particular when bagging dusty, fine-grain products since these products must as a rule be compacted to provide a firm package containing the smallest possible amount of air. Trapped air moreover reduces the stacking capability.

Rotary packaging machines in indexed operation can basically ensure increased filling rates since e.g. in one position up to e.g. 90% of the intended fill quantity is filled in high speed while in the next angular position the remaining quantity is filled in slow speed. In the subsequent angular position the product in the bag can be compacted further and deaerated. The following step provides for discharge and then for the appending of another open-mouth bag.

In the case of a packaging machine provided for gross weighing the bag appended to the filling spout must be continuously weighed during the filling process. Filling is stopped as the target weight has been reached. The drawback of this is that vibrating devices for compacting the filled product do not only act on the bag but the vibrations are also transmitted directly to the scales so that incorrect weights may be measured. Therefore the vibrating device is switched off during filling. This alternating weighing and vibrating, however, reduces the filling rate.

Another option is filling by way of a differential weighing device. Such a system has been disclosed e.g. in DF 10 2008 043 545 A1. Therein the filling rate is increased by employing a bagging carousel having two differential weighing devices for high seed filling and a differential weighing device for low speed filling. However, despite the three differential weighing devices, the filling rate is still rather low. This system shows another drawback in that in the worst-case scenario, any inaccuracies of all three of the differential weighing devices used may add up so that it is difficult to ensure precise weighing. Moreover in the case of e.g. poorly flowing bulk goods, caking may occur within the product path. When part of the intended fill cakes at the wall then the currently processed container will be underweight. When caking detaches at a later time then a following container will show some overweight.

SUMMARY

It is therefore the object of the present invention to provide a packaging machine for filling bags and a method for filling bags which enable high filling rates combined with high weight precision.

A packaging machine according to the invention serves for filling bags, comprising, a supporting structure with at least one filling box fastened thereto. The filling box comprises a conveyor element, and a weighing device and a filling spout are assigned to the filling box. At least one control device is provided. The filling box is held non-communicating with the supporting structure and the associated filling box, and is weighed separately by the associated weighing device so as to discharge from the filling box a predefined quantity of intended fill by way of differential weighing and fill it into the bag through the filling spout. The control device is configured for timing the strength of the volume flow into the bag throughout the filling process so that the intended till is maintained at a high level during filling while overflow is concurrently prevented.

The packaging machine according to the invention has many advantages. A considerable advantage of the packaging machine according to the invention is that, as regards the actual weighing, the filling box is not in communication with the supporting structure and the filling spout. The weight curve of the filling box during the filling process allows simple conclusions about the product contained in the bag. The fact that the filling box is non-communicating with the filling spout and the bag appended thereon as regards the actual weighing allows to basically perform any desired handling of the bag even during the filling process. Therefore any desired compactor can act on the bag even during the filling process without running the risk that the weight measured is false and thus an incorrect product quantity is filled into the bag.

In particular in the case of fine-grain bulk goods showing a considerable proportion of air the filling process can thus be accelerated. A compactor that is for example configured as a vibrating device can thus act on the bag fill virtually from the start of bagging so that deaeration begins virtually immediately. Such a packaging machine with one differential weighing device assigned to each filling spout allows efficient and precise bagging of a great variety of products and in particular products difficult to bag which for example tend to caking. The fact that the product supplied to each bag has been weighed by one single weighing device allows to achieve and to guarantee high accuracy.

In preferred specific embodiments each filling box comprises at least a storage volume that is larger than the maximum volume of a bag fill. The storage volume of a filling box may for example be larger than or equal to 1.5 times the intended fill volume. The storage volume is preferably larger and may be 2 times, 3 times, or a larger multiple of the maximum intended fill volume. These storage volumes allow to achieve high filling precision.

Preferably a multitude of filling boxes is fastened to the supporting structure. In particularly preferred configurations the supporting structure is disposed to rotate about a central axis together with the filling boxes and in operation it rotates indexed or even continuously.

In an advantageous specific embodiment the control device is adapted to control the conveyor element by way of the signals from the weighing device such that the predefined quantity can be filled into the bag from the filling box. In the case of multiple filling boxes the central control device may control the conveyor elements of all the filling boxes. Or else one separate control device may be provided for one filling box each. Or else one central control device may be provided while each of the filling boxes comprises an additional, separate control device for locally controlling the filling process.

Preferably at least one compactor has at least one filling spout assigned to it. Particularly preferably at least one compactor is operated in particular during the filling process. Employing at least two compactors for at least one filling spout or one filling unit is particularly preferred. For example a compactor may comprise, or be configured as, a bottom vibrator. It is also possible and preferred for a compactor to comprise, or to be configured as, a poker vibrator. A compactor may likewise comprise a vacuum lance. In particular at least one compactor is configured to be immersed from above into the open-mouth bag during the filling process. Compactors acting from inside immersed in the bag are in particular employed when filling open-mouth bags.

In all the configurations it is preferred to provide at least one compactor to be height-adjustable. What is provided to be height-adjustable may both be a poker vibrator immersed in the bag from above, and a bottom vibrator beneath the bag intended for filling and acting on the hag bottom from beneath. It is also possible to provide lateral compactors configured for example as pressure jaws and pressing on the bag from the sides. Compactors acting from the outside may be used both with packaging machines for filling open-mouth bags and with packaging machines for filling valve bags.

A filling spout assigned to the filling box is preferably rigidly connected with the supporting structure and elastically connected with the filling box. This means that the supporting structure supports the filling spout while the filling box is disposed so that its weight is not in communication with the filling spout and the supporting structure.

At least one controllable closing head or dosing element is preferably assigned to the silo. The silo serves in particular as a storage container. A supply is periodically conveyed from the silo into the storage volume of the filling box so as to keep at all times a sufficient storage volume in the filling box for carrying out at least the next filling process.

For rotary packaging machines it is possible and preferred for the silo to be accommodated on and to rotate along with the supporting structure so that each of the storage containers or filling boxes can be filled up at any time. Or else the silo may be positioned stationary above the supporting structure so as to allow filling up the storage volume in the filling box only in specific angular positions.

As the controllable dosing element at the silo is activated, a batch of intended fill is filled into the filling box. The weighing device assigned to the filling box allows to capture this quantity so as to derive therefrom the number of possible filling operations. Therefore the quantity conveyed into the filling box does not need to be predetermined but it may show even considerable variations.

It is particularly preferred for the conveyor element to comprise a filling turbine having a conveying speed that can be controlled in particular variably. This allows variable filling rates so that for example controlling the conveying speed of the filling turbine allows to split the operation into at least one high speed flow and at least one low speed flow, or else the filling rate may be continuously reduced until the target fill weight is reached.

It is also possible and preferred to employ other conveying principles for the filling elements such as an air filling method with a pressure chamber, or screw conveyor elements, or downspout elements.

Preferably the conveyor element has at least one stopping device and/or at least one stop valve assigned to it and the stopping device is in particular configured as a stop valve in the shape of a lock valve or a squeeze valve or the like. The product flows into the bag through an elastic hose that severs connection with the weight of the filling box and connects it with the filling spout. Mechanically severing the connection with the filling box may e.g. be done via counterguide links.

In all the configurations it is possible and preferred to provide at least one sensor for capturing a fill height. A sensor capturing the fill height in the bag during the filling process offers considerable advantages since it allows filling sensitive to, and controlled by, the fill height. This allows to ensure that the fill height in the bag is the highest possible at all times while on the other hand being low enough to reliably avoid contamination of the top bag wall or escape of product intended for bagging from the top bag opening. This applies in particular to open-mouth bags.

The filling spout preferably comprises a filling opening. For filling open-mouth bags the filling spout is in particular oriented substantially suspended so as to allow appending an open-mouth bag to the filling spout by way of upwardly movement relative to the filling spout. In the case of valve bag machines the filling spout is oriented more horizontally and allows automatic or manual bag placement with known equipment.

The control device together with the controllable filling element serves as a volume control device to control the strength of the volume flow into the open-mouth bag during the filling process. A sensor for capturing the fill height can be employed for timing. Otherwise, history data or empirical values may be referred to for ensuring optimal filling of the bag. In all, the cases the conveyor element serves as a dosing device for transporting the intended fill from the filling box into the open-mouth bag. The weighing device serves as a differential weighing device and it determines the weight of the bag fill from the weight reduction of the filling box.

The method according to the invention serves for filling bags and is carried out by way of a packaging machine with at least one filling box fastened to a supporting structure. The or each filling box comprises a conveyor element. The filling box has a weighing device and a filling spout assigned to it. The filling box is held non-communicating with the supporting structure and the assigned filling spout. The filling box is weighed separately by the assigned weighing device for discharging from the filling box, by way of differential weighing, a predefined quantity of product fill, controlled by a control device, and filling into the bag through the filling spout. The control device times the strength of a volume flow into the bag via the filling process such that the product fill height remains high during the filling process while overflow is concurrently avoided.

The method according to the invention also has many advantages since it allows to efficiently fill bulk goods into bags with a high degree of accuracy.

The strength of the volume flow is preferably timed during the filling process in dependence on the duration of filling. In particular when filling open-mouth bags the filling process is preferably started at maximum volume flow until an intended level is reached. Thereafter the fill height is maintained the highest possible for the remaining filling time to ensure the fastest filling speed possible and efficient deaeration.

During the filling process the fill height may be captured and the volume flow may be controlled in dependence on the fill height.

When filling open-mouth bags the product fill height is on the whole maintained high during the filling process while at the same time overflow or contamination of the top bag wall is avoided. Otherwise the top inner bag wall must be cleaned prior to closing to ensure leak-proof closing.

In all the cases it is possible to operate the conveyor element indexed and in particular to switch it on and off periodically. Or else it is possible and preferred to control the filling rate of the conveyor element variably and continuously or quasi continuously.

It is also possible to preferably periodically reduce and enlarge the filling path. It is possible to provide for part or all of the filling path to be closed off.

The packaging machine may be equipped with multiple filling boxes and it may be operated rotating in particular continuously or indexed.

On the whole the invention provides an advantageous apparatus and an advantageous method which allows already during the filling process to handle the bag in any way desired to accelerate the filling process and deaerating. The invention may be employed with packaging machines for filling open-mouth bags and also with packaging machines for filling valve bags.

Further advantages and features of the present invention can be taken from the exemplary embodiment which will be described below with reference to the enclosed figures.

DETAILED DESCRIPTION

Figure 1:
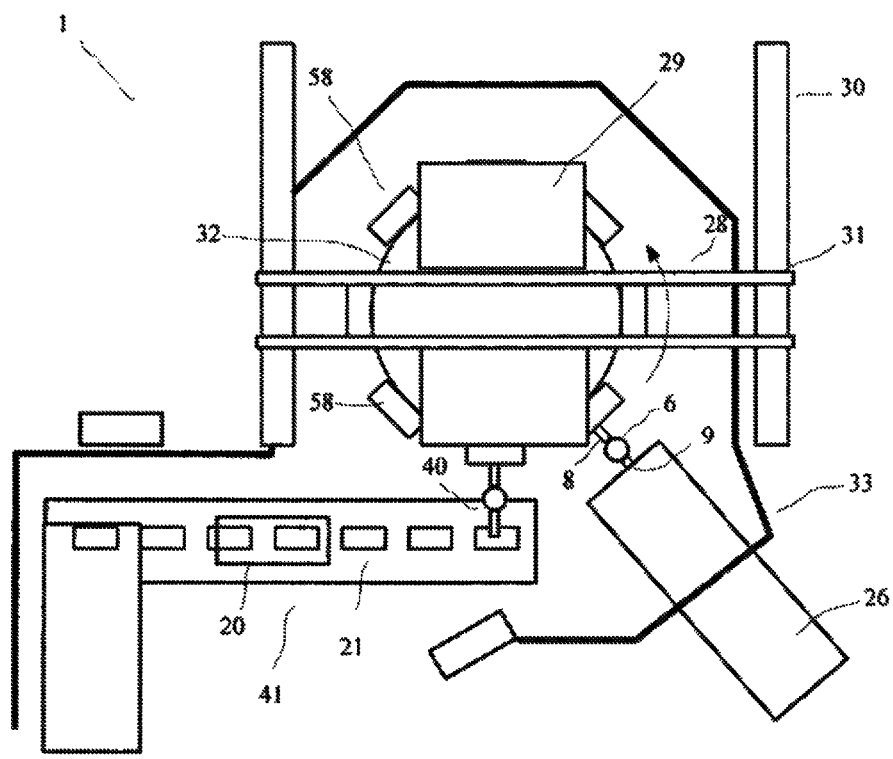
FIG. 1 a schematic top view of a packaging machine according to the invention.

With reference to the enclosed figures an exemplary embodiment of a packaging machine 1 according to the invention will be discussed below as it is illustrated in FIG. 1 in a schematic top view.

The packaging machine 1 is configured rotary and serves to fill open-mouth bags 2. The packaging machine 1 is provided with a plurality of filling units 58. Each of the filling units 58 comprises a filling box 3 having one filling box 4 each assigned to it. The presently illustrated packaging machine 1 may be provided with about two to about sixteen filling spouts 4. Basically it is also possible to mount still more filling spouts 4 to a rotary packaging machine 1. Stationary packaging machines configured e.g. as a single-spout machine or series packer are likewise possible and preferred.

In this example the packaging machine 1 rotates counterclockwise in the direction of rotation 28. The rotary packaging machine 1 is operated rotating continuously so that the filling spouts 4 rotate about a center axis 37 at substantially constant speed. The speed depends in particular on the intended fill and its compacting characteristics. The intended fill material is fed through an inlet hopper 29 to a central silo 32 which presently rotates along. Each filling box 3 has a dispensing silo 48 assigned to it, separate from the silo 32 so that a separate intermediate silo is assigned to each filling spout 4.

The filling spouts 4 for filling the open-mouth bags 2 are presently oriented vertically so that the filling opening 5 is directed perpendicularly downwardly. Or else it is possible for the filling opening to be oriented at an inclination to the vertical. For example an angle of five degrees, ten degrees, or else twenty degrees or more to the vertical may be provided. Open bags 2, also referred to as open-mouth bags, are presently appended from beneath to the bottom filling opening 5 of the filling spouts 4. In other configurations it is also possible to fill valve bags wherein these configurations provide for the filling spouts to be oriented more horizontally.

For filling, an open-mouth bag 2 is gripped and the upper bag wall 18 is opened so as to form the upper bag opening. Suckers and grippers are preferably used so as to form at the top end of the open-mouth bag 2 a bag opening matched to the cross-sectional shape of the filling spout 4. These hold the open-mouth bag 2 in a defined position by its top bag wall 18 until the open-mouth bag 2 has been sleeved over the filling spout 1 where it is again held in a defined position by grippers (not shown.).

The open-mouth bags 2 are placed by way of a transfer device 6 positioned downstream of a bag former 26. During the continuous operation the bag former 26 presently manufactures individual open-mouth bags 2 from a tubular sheet. Desired lengths are cut off the tubular sheet and the bottom seams are made in the open-mouth bags 2. Or else, prefabricated bags 2 may be used.

For placing an open-mouth bag 2 intended for filling, an open-mouth bag 2 received at the gripping arm 8 of the transfer device 6 is e.g. appended to a filling spout 4 of the packaging machine 1. The transfer device 6 thereafter continues rotating so that the next step provides for a bag to be placed by the gripping arm 9 while the gripping arm 8 is receiving another bag.

The open-mouth bags 2 are filled during rotation, which in this instance is counter-clockwise. In other system configurations, clockwise rotation is possible. The filling process takes place during rotation. Simultaneously the compactors 19 attain compacting of the product so that the product level is reduced. Due to the product being compacted the open-mouth bags 2 required are on the whole shorter and a tightly filled open-mouth bag 2 is formed that does not only use little sheet material but also offers an optically attractive appearance. The compactors 19 or individual compactors 19 are in particular provided to be height-adjustable.

The sheet material preferably used for manufacturing the open-mouth bags 2—compared to paper bags—results in a comparatively low inherent stiffness of the open-mouth bags 2. A precisely defined guiding of the open-mouth bags 2 is ensured at all times to enable comparatively short bag lengths and little bag material overhang as well as safe operation.

When the open-mouth bag 2 is filled with the intended quantity and reaches the angular position of the discharge device 40, the open-mouth bag 2 is discharged from the filling spout 4. The open-mouth bag 2 is discharged from the filling spout during the ongoing rotation of the packaging machine 1. The discharged bag 2 is transferred by the discharge device 40, which is likewise rotary, to the handling device 41 which comprises a linear guide 21 and one or more closing device(s) 20. The at least one closing device 20 closes the open top of the open-mouth bag 2. In discharge it is again always ensured that holding and guiding the open-mouth bag 2 is defined at all times so that a defined closing of the open-mouth bags 2 can be ensured.

A protective fence 33 may be provided to prevent access to the hazardous zone.

The rotary packaging machine 1 is preferably suspended from a frame 30 with poles 31 supporting the rotary packaging machine. A guide or centering 34 on the floor serves for defined guiding. In the upper range of the rotary portion a silo 32 may be provided for intermediate product storage. Other configurations may also include a stationary silo 32 disposed above the rotary portion of the packaging machine 1.

Each of the filling spouts 4 in the present exemplary embodiment has two separate compactors 19 assigned thereto. A compactor 19 is provided beneath the bag bottom. The bag bottom of the open-mouth bag 2 intended for filling is at least during part of the filling process supported on the compactor 19 which is presently configured as a vibrating device and in particular as a bottom vibrator 55, applying the vibrations in the vertical direction on the open-mouth bag 2 intended for filling to compact the product 27 inside the open-mouth bag 2 during the filling process and to deaerate the product 27. The bottom vibrator 55 is provided height-adjustable in the direction of the arrow 57 and it can be displaced both upwardly and downwardly. The bottom vibrator 55 is supported on the supporting deck 17 of the supporting structure 15.

Furthermore another compactor 19 is provided which likewise applies vibrations into the filled bulk material. This compactor 19 comprises a drive 42 and a poker vibrator 43 which presently also acts via vibrating movements and during the filling process dives from above into the open-mouth bag 2 intended for filling. The filling spout 4 comprises a through hole through which the poker vibrator 43 can dive from above into the open-mouth bag 2 intended for filling.

Preferably the poker vibrator 43 dives from above through the filling spout 4 into the opened open-mouth bag 2 after the open-mouth bag 2 intended for filling has been appended. As the filling process is completed the poker vibrator 43 is pulled out upwardly.

It is also possible to append an open-mouth bag 2 intended for filling to the filling spout 4 from beneath while the poker vibrator is already extending downwardly through the filling spout if a suitable appending mechanism is provided for the open-mouth bag 2 intended for filling.

Figure 2:
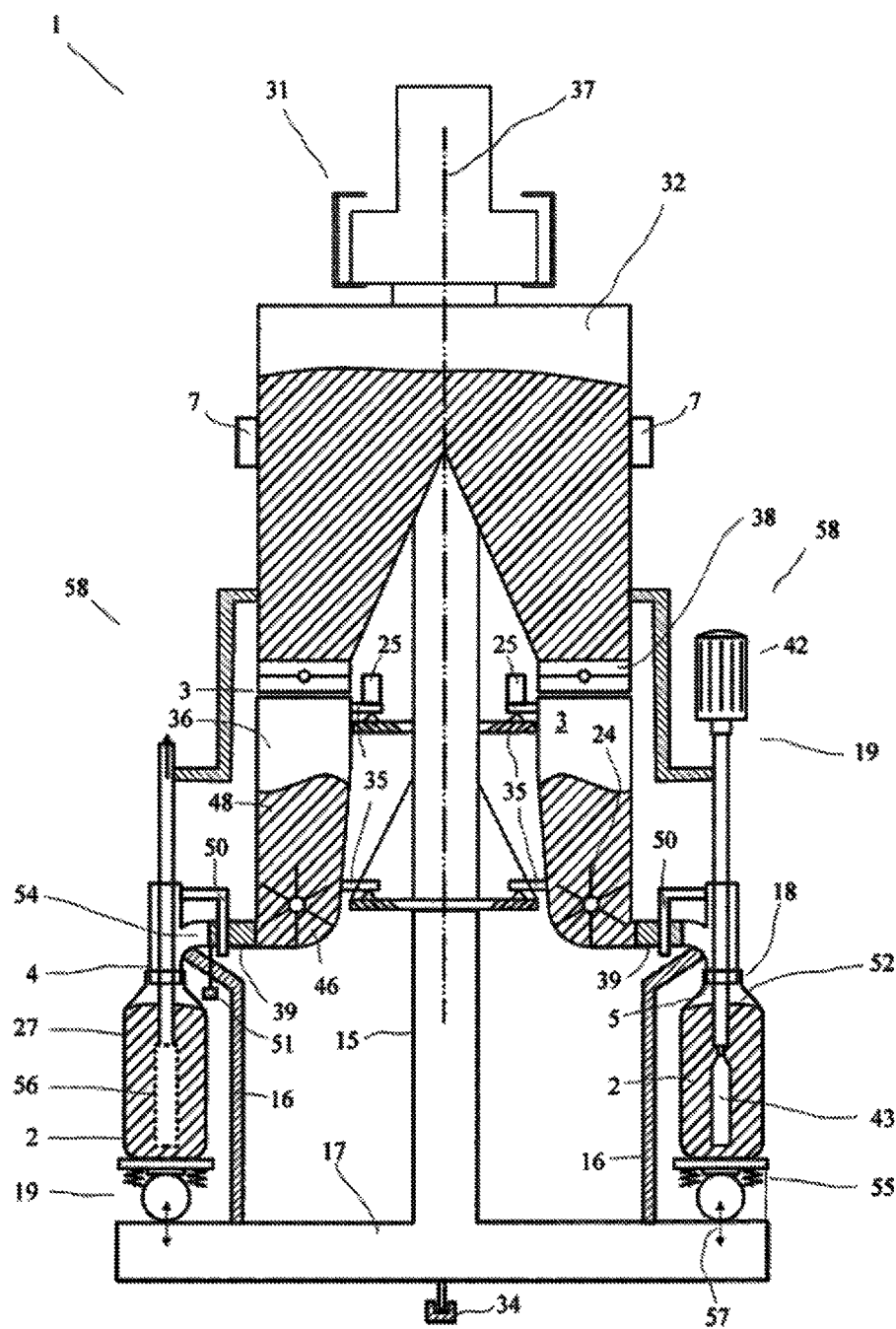
FIG. 2 a side view of the packaging machine according to FIG. 1.

It is also possible to configure the upper vibrating device 19 as a vacuum lance 56 which dives into the bag 2 from above and, via the applied vacuum, draws air out of the interior of the bag 2 while material is prevented from escaping by way of suitable, filters. Such a configuration is schematically shown on the left in FIG. 2. It is also possible for a poker vibrator and a vacuum lance to be inserted from above selectively, or depending on the product, or sequentially.

During the filling process a measure of the weight of the product 27 bagged thus far is determined continuously or at periodic intervals. A weighing device 25 is provided therefor which is presently configured for differential weighing. The differential weighing device determines the weight of the filling box 3 including the equipment installed therein such as the filling turbine 46 which is the filling or conveyor element 24 and the fill product 27 in the filling box 3 or in the dispensing silo 48. The weight of the fill product 27 in the bag 2 is determined continuously or at short time intervals from the weight reduction of the filling box 3.

While the filling spout 4 is presently rigidly connected with the supporting structure 15 of the packaging machine 1 via a supporting arm 16, it may be provided to fold up or down. The filling spout 4 is connected with the filling box 3 via an elastic hose 39 so that its weight is non-communicating. The elastic hose 39 is part of the product path. Due to the elastic hose 39 any vibrations on the filling spout 4 which may be transmitted to the filling spout e.g. through the compactors 19 do not affect the weight determined by the weighing device 25. The weighing device 25 operating by way of differential weighing captures at all times a correct measure of the product fill in the bag. The filling box is supported parallelogram type by way of counterguide links 35.

The captured weight amount is independent of the bag weight and is not adulterated by any concurrent handling of the bag. The outer surface may be pressed, the bag may be subjected to vibrations, and/or air may be extracted from the interior. These measures do not affect the captured weight at all or only to an extent within the weighing tolerances.

During the filling process the filling turbine 46 conveys the intended fill product 27 from the storage volume 36 of the filling box 3 into the bag 2. The storage volume 36 of the dispensing silo 43 is provided larger than the maximum fill volume of one bag 2. The storage volume 36 is in particular at least 50% larger and preferably at least two or even three times the maximum fill volume of one bag 2.

When the supply remaining in the filling box 3 is no longer sufficient or as it falls beneath a specific amount, the closing head 38 is opened and more product is conveyed into the filling box from above. During this time there is no filling. Prior to opening and after closing, the weight of the filling box is captured for controlling and capturing the fill quantity. The closing head 38 may be provided for defined controlling and it may be configured as a filling element for defined filling of fill product into the storage volume 36 of the filling box.

Since the individual weights of each of the components involved are known, the total weight measured by means of the weighing device 25 allows to determine the weight of the filled bulk material or the product 27. By way of severing communication between the filling spout 4 and the lower and upper compactors 19 from the filling box 3, the weight of the bag and the fill 27 can be determined accurately while the compactors 19 are concurrently compacting the fill. Thus, high filling rates are possible at high accuracy even in the case of difficult, e.g., adherent products.

The closing head 38 is activated at the latest as the product stored in the filling box 3 is less than the intended fill quantity for one bag 2, and a new supply is filled from the silo 32 into the filling box 3. As a rule, care is taken to not let the fill height in the filling box 3 drop beneath a minimum value.

The conveyor element 24 functioning as a doing device can be controlled by way of the current weight of the filling box 3 to convey a precisely defined quantity of bulk material into the open-mouth bag 2 intended for filling.

The conveyor element 24 presently comprises a filling turbine 46 and a lock valve 50 disposed downstream in the product path which may for example be configured as a lock valve or a squeeze valve. The stopping device 50 that is configured e.g. as a stop valve is in particular provided in an elastic region 39 of the filling path 54 that is disposed on the separation line between the weighed filling box 3 and the filling spout 4. In this way communication with, the weighed system is severed. The filling path 54 which is preferably formed by an elastic hose can be squeezed shut by a scissor valve or the like to close off the filling path 54. To still further enhance severing, a first elastic hose may serve to sever communication between weights. Then the scissor valve or the like preferably acts on a second elastic hose disposed separately thereof so that any forces introduced by the scissor valve cannot adversely affect the weight determined. Alternatively or supplementarily the rotational speed of the filling turbine 46 may be reduced or it may be switched off entirely.

Furthermore a sensor 51 may be provided which may be disposed external of the open-mouth bag 2 or else inside the open-mouth bag 2 during the filling process to determine a fill height 52 during the filling process. The sensor 51 may for example be designed for capacitive or inductive operation or it may determine the fill height 52 in the bag 2 during the filling process for example by way of an ultrasonic or an optical method.

By means of a control device 7 which may be assigned to one filling unit 58 each or else which may assume central control of all the filling units 58, the dosing device or the conveyor element 24 may be controlled by way of the fill height values 52 obtained, so that the fill height 52 is the highest possible while at the same time in does not reach up to the filling spout 4 so as to reliably avoid contamination of the top edge of the bag wall 18.

This allows on the one hand to ensure a most efficient and fast filling while on the other hand the top edge of the bag wall 18 remains clean and a permanently stable closing seam after the filling process can be ensured.

The filling process can also be controlled without a sensor 51. In this way reference is for example made to empirical data and the filling process for a fill product is experimentally determined through testing so as to enable an optimal fill height curve.

The control device 7 and the conveyor element 24 and sensor 51, if any, in combination form a volume flow control device for controlling the volume flow.

Figure 3:
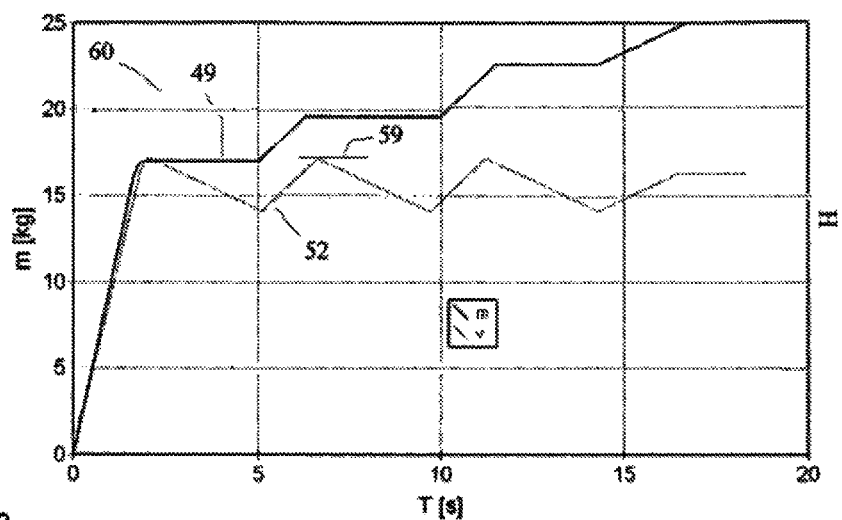
FIG. 3 the weight curve and the fill height curve of an open-mouth bag during the filling process.

FIG. 3 shows the typical weight curve and the fill height curve in a filling process.

The entire filling process presently takes about 17 seconds. In this example, 25 kg of bulk material is bagged. When the filling process is started the conveyor element is preferably operated at the maximum conveying speed to have a high volume flow enter the open-mouth bag intended for filling at the beginning of the filling process. The mass flow ensues from the gradient of the weight 49 over the time T. As the fill height or the height H reaches an intended measure 59 which has either been determined empirically or else is detected by a sensor 51, the conveying speed 44 of the conveyor element 24 is reduced or even switched off.

Figure 4:
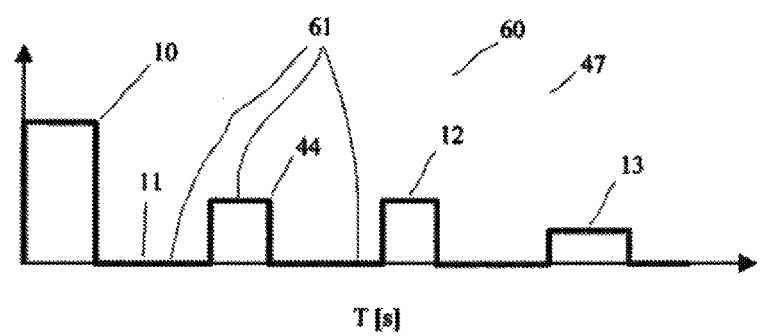
FIG. 4 the conveying speed of the conveyor element during the filling process illustrated in FIG. 3.

The conveying speed 44 and thus the approximate volume flow 47 of the conveyor element 24 is illustrated. In FIG. 4 over the time T for the filling process according to FIG. 3.

At the beginning of the filling process the fill product 27 is conveyed into the open-mouth bag 2 intended for filling at the maximum conveying speed 10. For example the speed of rotation of a filling turbine 46 can be chosen to be particularly high as the filling process begins.

As the intended maximum fill height 59 is reached, the conveying speed 44 is reduced for example by switching the filling turbine off. The conveying speed 11 in the subsequent cycle consequently drops to zero. As the product level has dropped by a predetermined measure by way of the concurrent compacting by the compactor 19, the filling turbine 46 is switched back on and is for example operated at a lower conveying speed 12 until the fill height 52 has again reached the intended maximum level.

A settling phase may follow during which the filling turbine may remain switched off. By way of the concurrent compacting which also already occurs by natural liberation of gas and which is considerably increased by the compactors 19 the volume of the bulk material decreases over time. Finally the filling turbine 46 is switched back on and product is once again filled into the open-mouth bag 2 intended for filling at the conveying speed 12. The weight of the fill product 27 increases correspondingly at the operating times of the filling turbine 46. What is in fact measured is the reduction of weight of the associated filling box 3 as it is captured by means of the weighing device 25. The weight curve presently illustrated is derived therefrom.

Near the end of the filling process, as the intended, fill weight has been nearly reached and for example only 10% of the weight intended for filling remain to be filled, the conveying speed 44 of the filling turbine 46 can be reduced still further and conveying may be continued for example at half speed. This conveying speed 13 ensues near the end of the filling process so that the weight gradient over the time is correspondingly lower during the conveying speed until the intended total weight is reached.

The provided conveying cycles certainly do not have to be limited to four as it is illustrated in the FIGS. 3 and 4, but 5, 6 or more conveying cycles or less—for example 2 or 3 conveying cycles—may be provided until, the open-mouth bag 2 is filled. The number and nature of cycles in particular depends on the intended fill product and also on the package size.

In other configurations it is also possible for the conveying speed 44 of the conveyor element 24 to be operated continuously varying such that, as the intended maximum fill height is reached, there will be no more volume increase but only—depending on the progressive compaction of the product—a weight increase until the pre-defined weight is reached.

It is possible to attain the reduced conveying speed 13 according to FIG. 4 by reducing the speed of rotation of the filling turbine 46. Or else it is possible attain a reduction of the conveying speed 13 by closing off part of the filling path 54 by means of the stopping device 50.

Figure 5:
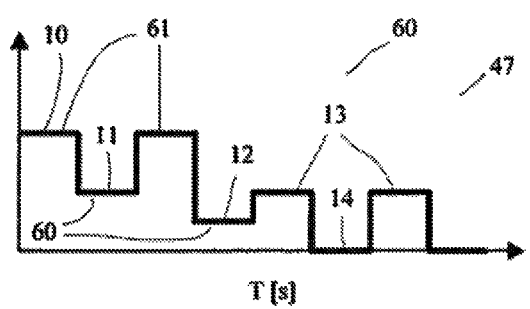
FIG. 5 the conveying speed of the conveyor element during another filling process.

FIG. 5 shows another filling process where the filling process 60 is exemplarily subdivided into filling cycles 61 of equal duration.

After stashing the filling process, firstly the maximum conveying speed 10 is set in the first filling cycle 61. Then follows a filling cycle 61 e.g. showing half the conveying speed 11 so as to reduce the volume within the bag 2 by deaerating while filling is continuing with the compactor 19, 43 remaining activated. Thereafter another cycle 61 follows with a higher, presently e.g. maximum, conveying speed 10. Thereafter, while the compactors 19, 43 remain activated, a conveying speed 12 is set which may e.g. be 25% of the maximum conveying speed 10, so as to reduce the volume while compacting is continuing during slow filling. Following this conveying cycle, a conveying speed 13 is set that is higher than the conveying speed 14. In the subsequent conveying cycle the conveying speed 12 is finally set to zero. The last conveying cycle following is once again a conveying speed 13 at which the final weight is reached and the system is switched off. In all the cases the conveying speeds can be increased continuously or periodically in fixed increments and decreased again. During the entire filling process 60 at least one compactor 19 is preferably operated.

The invention enables a simple structure that enables precise filling of bulk goods into open-mouth bags 2 at high speeds and highly reliably. The fact that the conveyor element cannot only be employed as a dosing device for controlling the intended fill weight but also for controlling the conveying speed, allows to considerably reduce the structural height compared to prior art systems. An intermediate depot for the product measured by a net-weighing device is not required so that the structural height may even be halved which considerably saves costs including for the surrounding installations since the required height of the building and the lifting height for the conveyed product are considerably reduced.

When filling open-mouth bags the reduced structural height also reduces the path which the product travels free-falling during the filling process over the net weighing filling process. In this way the proportion of air entrained into the open-mouth bag 2 by the bulk material is also reduced. Trials have shown that the proportion of air can be reduced by 10, 20 or even 30% so as to require less compacting time. This in turn leads to a considerably more effective and faster filling.

Thus the packaging machine according to the invention enables higher filling rates with reduced input.

Moreover the shorter product path during the filling process helps to better avoid product caking. The more efficient filling also enables the bagging of poorly flowing products the bagging of which has proved impossible or difficult or only with additional steps employed in the prior art packaging machines. Defects in capturing weights by products caking in the product path can be reliably avoided.

Irrespective of any weighing process the bag 2 intended for filling can be handled as desired at all times without adulterating the measured weights. No separate settling phase is required. The principle allows to prevent imprecise filling results due to added tolerances from several weighing devices. High filling rates with high filling precision are enabled without inadmissibly adulterating the weight measured.

LIST OF REFERENCE NUMERALS

| | |
|---|---|
| 1 | packaging machine |
| 2 | bag |
| 3 | filling box |
| 4 | filling spout |
| 5 | filling opening |
| 6 | transfer device |
| 7 | control device |
| 8 | gripping arm |
| 9 | gripping arm |
| 10 | conveying speed |
| 11 | conveying speed |
| 12 | conveying speed |
| 13 | conveying speed |
| 14 | conveying speed |
| 15 | supporting construction |
| 16 | supporting arm |
| 17 | supporting deck |
| 18 | bag wall |
| 19 | compactor |
| 20 | closing device |
| 21 | linear guide |
| 24 | conveyor element |
| 25 | weighing device |
| 26 | bag former |
| 27 | product |
| 28 | direction of rotation |
| 29 | inlet hopper |
| 30 | frame |
| 31 | pole |
| 32 | silo |
| 33 | protective fence |
| 34 | centering |
| 35 | counterguide link |
| 36 | storage volume |
| 37 | central axis |
| 38 | closing head |
| 39 | elastic hose |
| 40 | discharge device |
| 41 | handling device |
| 42 | drive |
| 43 | poker vibrator |
| 44 | conveying speed |
| 46 | filling turbine |
| 47 | volume flow |
| 48 | dispensing silo |
| 49 | weight |
| 50 | stopping device |
| 51 | sensor |
| 52 | fill height |
| 54 | filling path |
| 55 | bottom vibrator |
| 56 | vacuum lance |
| 57 | arrow |
| 58 | filling unit |
| 59 | predetermined height |
| 60 | filling process |
| 61 | conveying cycle |

The invention claimed is:

1. A packaging machine for filling bags comprising:
   a supporting structure;
   at least one filling box fastened to said supporting structure, said at least one filling box comprises at least one conveyor element and a silo, said silo configured to store an intended fill product and includes at least one of a controllable dosing element and a closing head;
   a weighing device and a filling spout assigned to said at least one filling box, wherein said filling spout is fastened to the supporting structure and is elastically connected with said at least one filling box;
   at least one control device associated with said at least one filling box;
   the filling box is retained non-communicating with the supporting structure and the assigned filling spout and the intended fill product is weighed separately by the assigned weighing device to discharge from the filling box a predefined quantity of the intended fill product by way of differential weighing and to fill the intended fill product through the filling spout into the bag; and
   the control device is configured for controlling the strength of the volume flow into the bag over the time of the filling process so that the intended fill product is maintained at a high fill height during the filling process while overflow is simultaneously prevented.

2. The packaging machine according to claim 1, wherein the control device is configured for increasing and decreasing the conveying speed during a filling process.

3. The packaging machine according to claim 1, wherein during a filling process, at least one conveying cycle of the at least one conveyor element alternates between higher and lower filling rates.

4. The packaging machine according to claim 1, wherein at least one compactor is assigned to at least one filling spout operated in particular during the filling process.

5. The packaging machine according to claim 4, wherein at least one compactor comprises a bottom vibrator, a poker vibrator and/or a vacuum lance.

6. The packaging machine according to claim 1, wherein the conveyor element comprises a filling turbine the conveying speed of which can be controlled variably.

7. The packaging machine according to claim 1, wherein the conveyor element has a stopping device which comprises a lock valve or a squeeze valve.

8. The packaging machine according to claim 1, further including at least one sensor for capturing a fill height.

9. The packaging machine according to claim 1, further comprising a plurality of filling boxes, wherein the supporting structure is configured to rotate about a central axis and rotates in operation, and wherein the silo is configured to rotate with said supporting structure.

10. A method for filling bags by means of a packaging machine, comprising:
   providing a supporting structure and at least one filling box, wherein said at least one filling box is fastened to said supporting structure and comprises a conveyor element;
   providing a weighing device and a filling spout each assigned to said at least one filling box, wherein said filling spout is fastened to the supporting structure and is elastically connected with the at least one filling box;
   holding the filling box non-communicating with the supporting structure and the assigned filling spout;
   separately weighing an intended fill product by the assigned weighing device to extract from the filling box a predefined quantity of the intended fill product by way of differential weighing, controlled by a control device; and
   filling the intended fill product through the filling spout into the bag,
   wherein during the filling process, a strength of the volume flow is timed by means of the control device in dependence on the filling duration so that a fill height of the intended fill product is maintained high during the filling process while simultaneously preventing overflow.

11. The method according to claim 10, wherein a fill height is captured during the filling process and the volume flow is controlled in dependence on the fill height.

12. The method according to claim 10, wherein during a filling process the conveying speed is increased and decreased.

* * * * *